Patented Aug. 17, 1948

2,447,063

UNITED STATES PATENT OFFICE 2,447,063

PROCESS FOR DRYING EGG SUBSTANCE AND RESULTING PRODUCT

Charles N. Frey, Scarsdale, and Glennard E. Miller, Bronx, N. Y., assignors to Standard Brands Incorporated, New York, N. Y., a corporation of Delaware No Drawing. Original application August 30, 1939, Serial No. 292,606. Divided and this application August 11, 1944, Serial No. 549,116

9 Claims. (Cl. 99—210)

The invention relates to a process for the treatment of egg substance, and to a product resulting therefrom.

More particularly, it pertains to a processing of egg white and to a dried white, and includes correlated improvements and discoveries relating thereto.

An object of the invention is the provision of a procedure in accordance with which the drying of egg substance may be facilitated.

A further object of the invention is to provide a procedure whereby egg substance, particularly egg white, may be obtained in dry form with suppression of foaming during the drying operation.

An additional object of the invention is to provide a process for the manufacture of dried egg substance, particularly egg white, which may be readily, efficiently and economically carried out commercially.

A more particular object of the invention is the provision of a manner for processing egg whites wherein foaming during drying is markedly suppressed by the inclusion of an ester of an aliphatic monocarboxylic acid.

Specific objects of the invention are to provide a process for the production of dried egg white, which entails inclusion of a lauric acid ester and a proteolytic enzyme and, as a composition of matter, a dried egg white containing a fatty acid ester which may be in conjunction with a proteolytic enzyme.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The drying of egg substance may be accomplished in the practice of the invention by incorporating an ester of a fatty acid, and then drying.

It is desirable also to include a proteolytic enzyme and in certain instances, as in the treatment of yolks or whole eggs, inclusion of the enzyme alone leads to a definite facilitation of the drying procedure. A rotary type of vacuum drum dryer has given satisfactory results, but other forms of drying may be utilized.

The ester of the fatty acid may be a simple one, as exemplified by the formula RCOOX, wherein R represents a saturated alkyl radical and X saturated and unsaturated hydrocarbon radicals, specifically propylene laurate of the formula $C_{11}H_{23}COOC_3H_5$. Further, the ester may be the reaction product between a polyhydric alcohol, for example, glycerol, erythrol, mannitol and sorbitol, and a higher molecular weight fatty acid, which may be lauric, palmitic, stearic or oleic. Utilization of such esters and resultant products are claimed and more fully described in our copending application, Serial No. 292,606, filed August 30, 1939, now Patent 2,358,132, granted September 19, 1944, of which the present application is a division.

The inclusion of a proteolytic enzyme brings about a thinning of the egg substance, specifically, the white, so that following filtering to remove any lumps or stringy substance, the whites may be more uniformly distributed over the drying surface, and utilization may be made of papain, trypsin, or bromelin. Moreover, the amount of the ester which may be added may be upwards to about 0.1% based upon the original weight of the egg substance. Preferably, about 0.01% is utilized and the addition of proteolytic enzyme may be in an amount of from 0.022% to 0.044%. While the treatment is ordinarily carried out at room temperatures, nevertheless a higher working temperature may be employed with attending decrease in time of treatment. It is to be borne in mind, however, that the temperature should not be sufficiently high to occasion a coagulation of the egg substance. A decrease in whipping property has been noted when larger amounts of the esters are employed. Hence, if the whipping properties are to be retained a smaller amount should be incorporated, whereas if such property is not a consideration, a larger amount may be included, whereby the drying time will be shortened, as shown by the quantity of egg substance that can be treated in a given period. The incorporation or inclusion of the ester and also of the proteolytic enzyme with the egg substance while in liquid state and prior to drying leads, of course, to obtainment of a composition, as egg white, having the ester and/or proteolytic enzyme within the albumen of the white, i. e., an intra-albumen content.

As an illustrative embodiment of a manner in which the invention may be practiced, the following examples are presented:

*Example I*

With 10 lbs. of egg white there is incorporated about 1 gram of a good strength papain. When the white has become thin it is filtered to remove all stringy material; and following addition of sorbitol laurate, having the probable formula $CH_2OH(CHOH)_4CH_2OOCC_{11}H_{23}$, in an amount of about 0.1% the mass is fed to a vacuum drum type of dryer. The thinning of the white by means of papain conditions it so that a uniform feeding to the rolls of the dryer may be effected, and the treatment with sorbitol laurate suffices to suppress foaming whereby it was found that the egg white could be fed to the rolls at a rate of 112 oz. per hour. Removal of the dried white is effected by a suitable scraping blade, and it is obtained as a flaky product which dissolves fairly well in water. When smaller amounts of sorbitol laurate were included, the following drying rates were obtained:

| Percentage | Ounces per Hour |
|---|---|
| 0.02 | 131 |
| 0.01 | 164 |
| 0.005 | 139 |

When thin whites were dried without the addition of sorbitol laurate there was a marked foaming of the mass, and such that only 44 oz. could be dried per hour.

*Example II*

Egg white was thinned with papain and filtered in the manner given in Example I. To this material there was added 0.01% of propylene laurate, having the probable formula $C_{11}H_{23}COOC_3H_5$, and the mass dried by introduction upon the rolls of a drum dryer. The mass dried well at a rate of about 102 oz. per hour, and gave a loose, flaky product which dissolved readily in water.

The treatments of egg substance, as described above, lead to a thinning thereof due to the action of the proteolytic enzyme, for example, papain, trypsin or bromelin, which permits, following removal of the stringy material, the feeding of the mass to drying rolls in a uniform manner so that drying is materially facilitated, as evidenced by the distinctly increased rate of drying. The addition of a fatty acid ester, as those above mentioned, especially the laurates and oleates, affords a manner in which the foaming which attends the drying of whites is suppressed to such an extent that there is no material hinderance during drying. The product obtained is in the form of a loose, flaky mass, which may be readily taken up in water.

Furthermore, the properties of the egg substance are not altered so that the dried material may be used in the manner and for the purposes usually attending dried egg substance. Moreover, the dried egg white may be whipped in the usual manner, and the whipping properties are not effected when lower concentrations of the ester are used. Hence, when the material is to be whipped, only a small amount of ester should be included, but when the whipping property may be disregarded, larger amounts may be incorporated. The effect upon whipping property is shown by the following:

One lb. each of original white treated with papain only, of original white treated with papain and containing 0.01% sorbitol laurate, and of dry white containing papain and sorbitol laurate, made up 65 grams to 1 lb., was whipped for five minutes. All of these materials reached about the same consistency, but the volumes of the sorbitol-treated white were somewhat less than the white treated merely with papain. Moreover, the sorbitol laurate materials were slightly slower in starting to whip, but good volumes were obtained. All three of the whips broke down at substantially the same rate. A like procedure with inclusion of 0.005% sorbitol laurate gave similar results upon whipping.

In accordance with the foregoing procedure egg substance may be dried at a decidedly increased rate, with an even flow of the substance upon the drying surface, with suppression of foaming and obtainment of the substance from the drying surface in the form of a fine, granular powder, or as a loose, flaky product.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for drying egg substance which comprises incorporating propylene laurate with egg substance, and then drying.

2. A process for drying egg whites which comprises incorporating propylene laurate with egg whites, and then drying.

3. A process for drying egg substance which comprises incorporating propylene laurate and a proteolytic enzyme with egg substance, and then drying.

4. A process for drying egg whites which comprises incorporating propylene laurate and papain with egg whites, and then drying.

5. As a composition of matter dried egg substance having an intra-albumen content of propylene laurate.

6. As a composition of matter dried egg whites having an intra-albumen content of propylene laurate.

7. As a composition of matter dried egg whites having an intra-albumen content of propylene laurate and a proteolytic enzyme.

8. A process for drying egg substance which comprises incorporating a propylene ester of a higher fatty acid belonging to the group consisting of lauric, palmitic, stearic and oleic acids with egg substance, and then drying.

9. As a composition of matter dried egg substance having an intra-albumen content of a propylene ester of a higher fatty acid belonging to the group consisting of lauric, palmitic, stearic and oleic acids.

CHARLES N. FREY.
GLENNARD E. MILLER.

REFERENCES CITED

The following references are of record in the file of this patent:

UNITED STATES PATENTS

| Number | Name | Date |
|---|---|---|
| 2,052,028 | Harris et al. | Aug. 25, 1936 |
| 2,073,411 | Balls et al. | Mar. 9, 1937 |
| 2,101,089 | Novak | Dec. 7, 1937 |
| 2,142,511 | Harris et al. | Jan. 3, 1939 |
| 2,176,078 | Katzman | Oct. 17, 1939 |
| 2,176,080 | Katzman | Oct. 17, 1939 |
| 2,182,209 | Newton et al. | Dec. 5, 1939 |
| 2,209,591 | Barnes | July 30, 1940 |
| 2,358,324 | Frey et al. | Sept. 19, 1944 |

Certificate of Correction

Patent No. 2,447,063.  August 17, 1948.

CHARLES N. FREY ET AL.

It is hereby certified that error appears in the printed specification of the above numbered patent requiring correction as follows: Column 2, line 11, for the patent number "2,358,132" read *2,358,324*; and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.*